(No Model.)

C. H. LEONARD.
REFRIGERATOR TRAP.

No. 434,283. Patented Aug. 12, 1890.

Witnesses
Robert Everitt,
J. A. Rutherford.

Inventor.
Charles H. Leonard.
By Edward Taygant.
Atty.

UNITED STATES PATENT OFFICE.

CHARLES H. LEONARD, OF GRAND RAPIDS, MICHIGAN.

REFRIGERATOR-TRAP.

SPECIFICATION forming part of Letters Patent No. 434,283, dated August 12, 1890.

Application filed July 9, 1889. Serial No. 316,912. (No model.)

*To all whom it may concern:*

Be it known that I, CHARLES H. LEONARD, of the city of Grand Rapids, county of Kent, and State of Michigan, have invented certain new and original Improvements in Traps for Refrigerators; and I do hereby declare that the following is a full and exact description thereof, reference being had to the accompanying drawings, being a part of this specification, in which—

Figure 1:
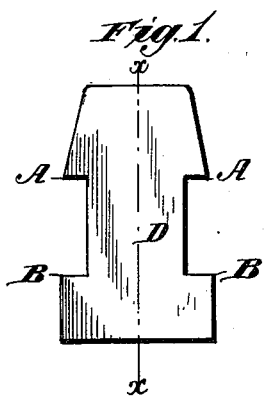
Figure 2:
Figure 3:
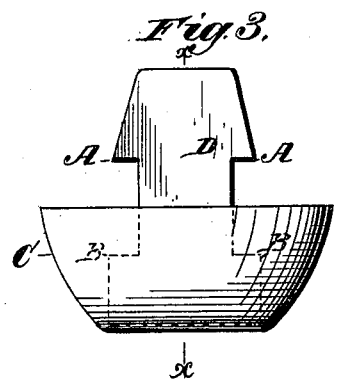
Figure 4:
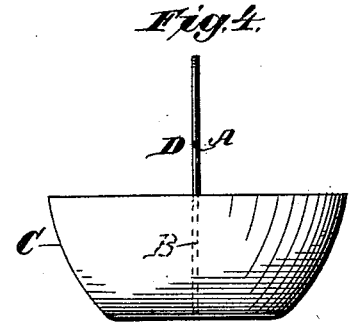
Figure 5:
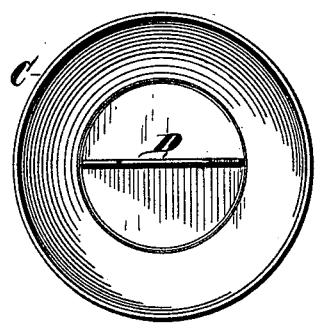

Figure 1 is a vertical view of the inside or tongue of the trap. Fig. 2 is a vertical section of same in the plane of the line X X, Fig. 1. Fig. 3 is a vertical view of the trap complete, and Fig. 4 is a vertical section of same on the line X X of Fig. 3. Fig. 5 is a plan view of the trap.

Like letters designate corresponding parts in all the figures.

Considerable difficulty is experienced in causing a trap to stay on the bottom of a waste-pipe and still be readily detachable for cleaning. Various devices have been invented and patented for this purpose—such as a spiral spring on the inside of the pipe, a bayonet-catch, and several others—but I attain same end by means of the simple construction described below.

The tongue D (shown in Fig. 1) is stamped by a die from a piece of sheet metal. The corners A A are very sharp, and the corners B B project a little beyond the points A A, to act as a stop when the trap is shoved up into the pipe. This tongue or strip of sheet metal is then soldered to the bottom of the cup C, and the trap is finished.

In operation, the tongue D can easily slip up on the inside of the pipe as far as the stop B; but it will not come out so easily, as the sharp points A A will cut a groove in the metal before the trap will come off. The stop B B is also useful to prevent the trap from slipping up so far in the pipe as to stop the flow of water.

When the trap is in place on the waste-pipe of a refrigerator, and the refrigerator is filled with ice, the bowl of the trap will fill and overflow with melted ice-water. The pipe will reach into the bowl of the trap as far as the stops B B, and, forming an air-tight joint, will prevent air from entering the refrigerator and wasting the ice.

Having thus described my invention, what I wish to secure by Letters Patent is—

The herein-described refrigerator-trap, composed of the bowl C, having a central vertical tongue D, provided on its opposite edges with sharp points A A to engage the interior of a waste-pipe, and the stops B B to limit its insertion into the lower end of said pipe, substantially as shown and described.

In witness whereof I hereunto sign my name in the presence of two subscribing witnesses.

CHARLES H. LEONARD.

Witnesses:
GEO. R. ALLEN,
JENNIE S. LOOMIS.